United States Patent
Akamatsu et al.

(10) Patent No.: US 9,547,817 B2
(45) Date of Patent: Jan. 17, 2017

(54) RF TAG

(71) Applicant: TOYO SEIKAN GROUP HOLDINGS, LTD., Tokyo (JP)

(72) Inventors: Shinya Akamatsu, Kanagawa (JP); Hironaga Shimizu, Kanagawa (JP); Takayuki Kikuchi, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/579,178

(22) Filed: Dec. 22, 2014

(65) Prior Publication Data

US 2015/0108221 A1 Apr. 23, 2015

Related U.S. Application Data

(63) Continuation of application No. PCT/JP2013/003832, filed on Jun. 20, 2013.

(30) Foreign Application Priority Data

Jun. 26, 2012 (JP) .................................. 2012-143329
Mar. 28, 2013 (JP) .................................. 2013-070056

(51) Int. Cl.
*G06K 21/06* (2006.01)
*G06K 19/077* (2006.01)
(Continued)

(52) U.S. Cl.
CPC ... *G06K 19/07794* (2013.01); *G06K 19/07722* (2013.01); *H01Q 1/2225* (2013.01);
(Continued)

(58) Field of Classification Search
CPC ...... H01Q 1/2208; H01Q 7/00; H01Q 13/085; H01Q 1/2225; H01Q 13/10; H01Q 19/10; H01Q 1/48; H01Q 15/14; H01Q 1/40; H01Q 9/26; H01Q 1/38; H01Q 1/521; H01Q 9/24; G06K 19/07749; G06K 19/0716; Y10T 29/49124

See application file for complete search history.

(56) References Cited

U.S. PATENT DOCUMENTS 8,742,895 B2  6/2014  Yoshida et al.
2003/0122233 A1  7/2003  Yagi et al.
(Continued)

FOREIGN PATENT DOCUMENTS

CN  101739597 A  6/2010
CN  101836328 A  9/2010
(Continued)

OTHER PUBLICATIONS

International Search Report for corresponding International Application No. PCT/JP2013/003832, mailed Sep. 17, 2013 (2 pages).
(Continued)

*Primary Examiner* — Thien T Mai
(74) *Attorney, Agent, or Firm* — Osha Liang LLP

(57) ABSTRACT

An RF tag includes an inlay comprising an IC chip and an antenna, a planar auxiliary antenna laminated on the inlay in an insulating state to the inlay, and a substrate on which the inlay and the auxiliary antenna are laminated. The auxiliary antenna is formed into a rectangular planar shape including long sides each having a length of substantially ¼ of a wavelength of a radio wave frequency of the inlay, and has a cutout part which divides one of the long sides into two parts each having a length of substantially ⅛ of the wavelength of the radio wave frequency of the inlay. The cutout part is formed into a concave shape which is opened in an edge portion of the one of the long sides and has a predetermined width and depth to allow the IC chip of the inlay to be disposed therein.

20 Claims, 10 Drawing Sheets

(51) Int. Cl.
  *H01Q 1/38* (2006.01)
  *H01Q 1/22* (2006.01)
  *H01Q 1/52* (2006.01)
  *H01Q 9/24* (2006.01)
  *H01Q 9/26* (2006.01)
  *H01Q 9/04* (2006.01)

(52) U.S. Cl.
  CPC ................ *H01Q 1/38* (2013.01); *H01Q 1/52* (2013.01); *H01Q 9/0457* (2013.01); *H01Q 9/24* (2013.01); *H01Q 9/26* (2013.01)

(56) References Cited

U.S. PATENT DOCUMENTS

| | | | |
|---|---|---|---|
| 2004/0219714 A1 | 11/2004 | Yagi et al. | |
| 2010/0123010 A1* | 5/2010 | Sakama | G06K 19/07749 235/492 |
| 2010/0231482 A1* | 9/2010 | Yoshida | G06K 19/07749 343/904 |
| 2010/0245049 A1 | 9/2010 | Yoshida et al. | |
| 2011/0180609 A1* | 7/2011 | Sato | H01Q 1/2208 235/492 |
| 2014/0224885 A1* | 8/2014 | Yoshida | G06K 19/07749 235/492 |

FOREIGN PATENT DOCUMENTS

| | | |
|---|---|---|
| EP | 2019425 A1 | 1/2009 |
| EP | 2214255 A1 | 8/2010 |
| JP | 2001-111328 A | 4/2001 |
| JP | 2003-256798 A | 9/2003 |
| JP | 2006-203852 A | 8/2006 |
| JP | 2009-081689 A | 4/2009 |
| JP | 2010-062941 A | 3/2010 |
| WO | 2010038813 A1 | 4/2010 |

OTHER PUBLICATIONS

International Preliminary Report on Patentability issued in PCT/JP2013/003832 mailed Jan. 8, 2015 (6 pages).
Written Opinion of the International Searching Authority issued in PCT/JP2013/003832 mailed Sep. 17, 2013 (4 pages).
Office Action in corresponding Chinese Patent Application No. 201380033273.X dated Jan. 18, 2016 (8 pages).
Extended European Search Report dated Dec. 23, 2015, issued by the European Patent Office in related European Patent Application No. 13809636.7 (12 pages).

* cited by examiner

RF TAG

TECHNICAL FIELD

The present invention relates to an RF tag which is attached to and used on each of various articles such as plastic bottles, glass bottles and metal containers, e.g., can containers and pouch containers for beverages and various liquids to be charged thereinto and used.

More particularly, the present invention relates to an RF tag which is attached to and used on each of metal containers and metal articles such as containers made of aluminum and heaters including cases made of a metal.

BACKGROUND ART

In general, so-called RF tags including IC chips, in which predetermined information on articles and objects is readably and writably stored, are broadly used to the various articles and objects.

The RF tag is also called an RFID (Radio Frequency Identification) tag, an IC tag, a non-contact tag or the like. The RF tag is a microminiature communication terminal, which is obtained by shaping, in the form of a tag (baggage tag), a so-called inlay (inlet) where an electronic circuit including an IC chip and a radio antenna is sealed or coated with a substrate such as a resin film. In the RF tag, reading-only the predetermined information from the IC chip, writing-once it in the IC chip, and reading it therefrom and writing it therein are possible by a reader/writer via radio.

Furthermore, when the predetermined information is written in such an RF tag and the thus treated RF tag is then attached to, e.g., each of various articles or objects, the information recorded in the RF tag is picked up by the reader/writer, to enable recognition, output, display, update and the like of the information recorded in the tag as the predetermined information on the articles.

In such an RF tag, several hundred bits to several kilobits of data can be recorded in a memory of the IC chip, and a sufficient amount of the information can be recorded as the information on each of the articles or the like. Furthermore, communication can be performed with a reading/writing device side in a non-contact manner, and hence there is no fear of wear, damage, dirt or the like on a contact. Additionally, the tag itself can include no power source, and hence processing, miniaturization and thinning of the tag can be performed in compliance with each object.

Furthermore, by use of such an RF tag, it is possible to record various pieces of information on each article to which the tag is attached, e.g., a name, an identification symbol, a content, components, a manager, a user, a use state, a use situation and a date of the article. Therefore, a large variety of pieces of information, which are impossible by characters, a bar code or the like printed and displayed on the surface of a label, can correctly be read and written simply by attaching the miniaturized and thinned tag to the article.

However, when this RF tag is attached to, e.g., each of plastic bottles and glass bottles to be charged with liquids and the like and then used, the tag is easily influenced by the content (water) in each container. Furthermore, when the tag is attached to each of containers and articles made of a metal, e.g., can containers and pouch containers, the tag is disadvantageously influenced by a conductivity of the metal. Thus, a communication distance changes or a radio communication cannot correctly be performed. Therefore, when the usual RF tag for general purpose is attached to each of the containers for beverages and the articles made of the metal as it is, the tag wrongly operates or the radio communication with the reader/writer cannot be performed.

Particularly, in the RF tag of a radio wave system using a high frequency band of a UHF band, as compared with a tag of an electromagnetic induction system using a 135 KHz or 13.56 MHz zone, the communication distance lengthens, but communication characteristics are noticeably impaired due to absorption of water, reflection by the metal or the like.

Further, for example, in Japan, a frequency band of the RF tag has been shifted from a heretofore used 950 MHz band (950 to 958 MHz: an 8 MHz width) of the UHF band to a 920 MHz band (915 to 930 MHz: a 15 MHz width) by the revision of the Radio Wave Law, and hence a utilizable frequency band has been enlarged.

Also in the RF tag using the 920 MHz band after the above shift, the abovementioned influence of the metal is not avoidable, and it is strongly desired that effective measures are taken.

Here, as means for improving communication characteristics in the RF tag, it has been suggested that an antenna disposed in the RF tag is constituted of a planar patch antenna (e.g., see Patent Documents 1 and 2).

The communication characteristics of the RF tag depend on a gain due to an antenna size. Therefore, when the antenna disposed in the RF tag is formed into the planar shape to increase the antenna size, a large communication distance is acquired to enable improvement of the communication characteristics.

CITATION LIST

Patent Documents

[Patent Document 1] Japanese Patent Application Publication No. 2009-081689
[Patent Document 2] Japanese Patent Application Publication No. 2010-062941

However, in an RF tag including such a heretofore suggested planar antenna as disclosed in Patent Documents 1 and 2, the antenna is simply formed into a planar shape, and communication frequency characteristics of the RF tag are not taken into consideration.

Therefore, the antenna is only formed into the planar shape, and there is the fear that the communication characteristics do not improve depending on a communication frequency of the RF tag.

For example, it is described in Patent Document 1 that the RF tag to be bonded to the surface of each credit card is picked up as a target, and an area itself that is assigned to the tag including the antenna is small. Therefore, it is actually impossible to design a size or shape of the planar antenna on the basis of its relation with the communication frequency of the tag. Furthermore, in the RF tag disposed in the credit card, communication between the same and a reader/writer is in a remarkably short distance and is substantially close to a contact state. Additionally, the tag and the reader/writer perform the communication in one-to-one relation. Then, it has not especially been necessary to design and regulate the size or shape of the planar antenna on the basis of its relation with the communication frequency of the tag.

Similarly, it is only described in Patent Document 2 that a planar patch antenna is employed as an antenna to reduce an influence on a metal surface, and the size or shape of the antenna has not been taken into consideration on the basis of its relation with the communication frequency of the tag.

Consequently, in the RF tags disclosed in Patent Documents 1 and 2, even when the antenna is formed into a planar or patch shape, communication characteristics cannot suitably be obtained depending on the communication frequency of the tag, and the short communication distance between the same and the reader/writer can only be acquired.

Therefore, it has been difficult to effectively avoid, for example, an influence of a container content (water) in a case where the tag is attached to each of plastic bottles and glass bottles to be charged with liquids and the like and then used, or an influence of a conductivity of each article made of a metal.

Furthermore, in such an RF tag that only has the short communication distance and only performs the one-to-one communication with the reader/writer as described in Patent Documents 1 and 2, a plurality of RF tags cannot collectively be recognized by the reader/writer. Additionally, for example, reading or the like of data cannot collectively be performed from the RF tags which are attached to a plurality of articles, respectively.

Furthermore, the RF tags suggested in Patent Documents 1 and 2 are based on the assumption that each tag is attached to a flat surface portion of each of the credit cards, iron and steel products, metal molds, manufacturing devices and the like, and the attaching to a curved surface portion of each of containers and cases made of a metal and having curved shapes is not taken into consideration.

In general, each of metal containers made of aluminum and heaters including cases made of a metal has a gently curved shape, and in this case, an attaching surface to which the RF tag is to be attached is often a curved surface having a predetermined curvature. Therefore, when a constitution for the metal is employed, an attaching structure is required which can securely be attached to such a curved surface and in which peel, drop-out or the like does not inadvertently occur. However, in the abovementioned RF tags disclosed in Patent Documents 1 and 2, the attaching to such a curved surface portion is not taken into consideration.

SUMMARY OF THE INVENTION

One or more embodiments of the present invention provide an RF tag which is suitable for each of plastic bottles and glass bottles to be charged with liquids and the like and used and in which a planar antenna corresponding to a communication frequency of an RF tag is formed, so that communication characteristics corresponding to the respective communication frequencies can suitably be obtained, an influence of water or a metal can effectively be avoided or reduced, and data can collectively be read from the plurality of RF tags.

Furthermore, one or more embodiments of the present invention provide an RF tag which is to be suitably attached especially to a curved portion of the surface of each of metal containers made of aluminum, heaters including cases made of a metal, and the like, and in which the planar antenna corresponding to the communication frequency of the RF tag is formed, so that the communication characteristics corresponding to the respective communication frequencies can suitably be obtained, and the influence of the metal can effectively be avoided or reduced. Additionally, also when an attaching portion is a curved surface, the tag can securely be attached without causing peel, drop-out or the like.

According to one or more embodiments, an RF tag comprises an inlay comprising an IC chip and an antenna, a planar auxiliary antenna laminated on the inlay in an insulating state to the inlay, and a substrate on which the inlay and the auxiliary antenna are laminated. The auxiliary antenna is formed into a rectangular planar shape including long sides each having a length of substantially ¼ of a wavelength of a radio wave frequency of the inlay, and has a cutout part which divides one of the long sides into two parts each having a length of substantially ⅛ of the wavelength of the radio wave frequency of the inlay, and the cutout part is formed into a concave shape which is opened in an edge portion of the one of the long sides and has a predetermined width and depth to allow the IC chip of the inlay to be disposed therein.

According to one or more embodiments, an RF tag comprises an inlay comprising an IC chip and an antenna, a planar auxiliary antenna laminated on the inlay in an insulating state to the inlay, and a substrate on which the laminated inlay and auxiliary antenna are mounted. The auxiliary antenna is formed into a rectangular shape including a pair of facing short sides and one long side adjacent to this pair of short sides having a length of substantially ½ of a wavelength of a radio wave frequency of the inlay, and comprises, in a central portion of the one long side, a central cutout part formed into a concave shape which is opened in an edge portion of the long side and has a predetermined width and depth to allow the IC chip of the inlay to be disposed therein, and comprises, in the one or other long side, a pair of right and left cutout parts opened in the edge portion of the long side on both sides sandwiching the central cutout part.

According to one or more embodiments of the present invention, the planar antenna corresponding to a communication frequency of the RF tag is formed, so that communication characteristics corresponding to the respective communication frequencies can suitably be obtained.

In consequence, an influence of water or a metal can effectively be avoided or reduced, and data can collectively be read from the plurality of RF tags. Therefore, it is possible to realize the RF tag suitable for a tag for a label attached to a plastic bottle or a glass bottle to be charged with a liquid or the like and used so that a plurality of containers are collectively packed in a box and conveyed, especially a bottle or the like for high-class liquor such as whisky, wine or Japanese sake.

Furthermore, according to one or more embodiments of the present invention, when the planar antenna corresponding to the communication frequency of the RF tag is formed, the communication characteristics corresponding to the respective communication frequencies can suitably be obtained, and the influence of the metal can effectively be avoided or reduced. Furthermore, also when an attaching portion is a curved surface, the tag can securely be attached without causing peel, drop-out or the like.

In consequence, it is possible to realize the RF tag to be suitably attached especially to a curved portion of the surface of each of metal containers made of aluminum, heaters including cases made of a metal, and the like.

DETAILED DESCRIPTION OF EMBODIMENTS

Hereinafter, embodiments of an RF tag according to the present invention will be described with reference to the drawings.

First Embodiment

First, a first embodiment of an RF tag according to the present invention will be described with reference to FIGS. 1 to 7.

Figure 1A:
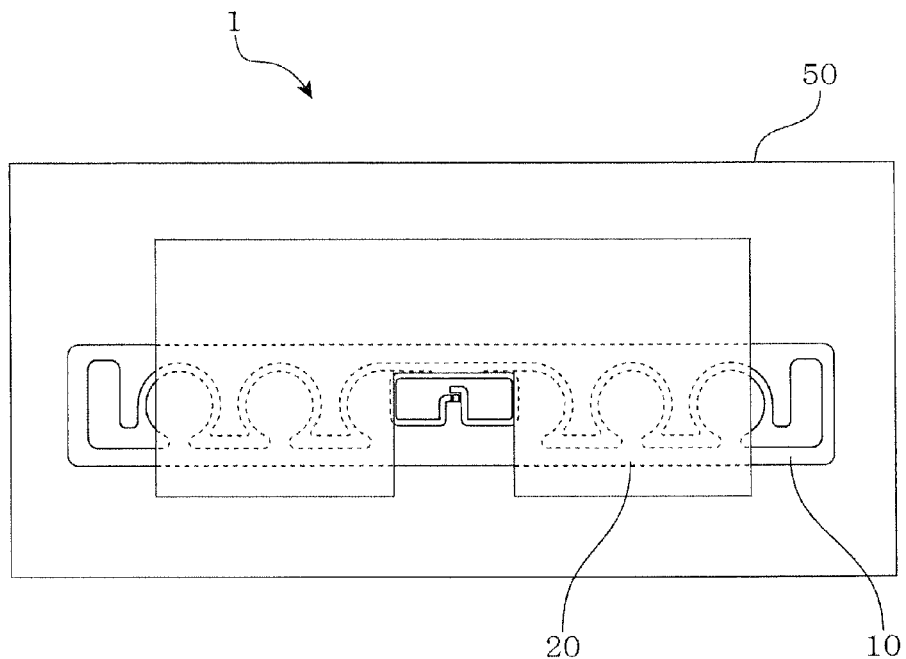
FIG. 1A is a plan view showing an RF tag according to a first embodiment of the present invention, i.e., an RF tag using a label to be attached to a container as a substrate of the tag, showing a state seen from a label back surface (attaching surface) side.
Figure 1B:
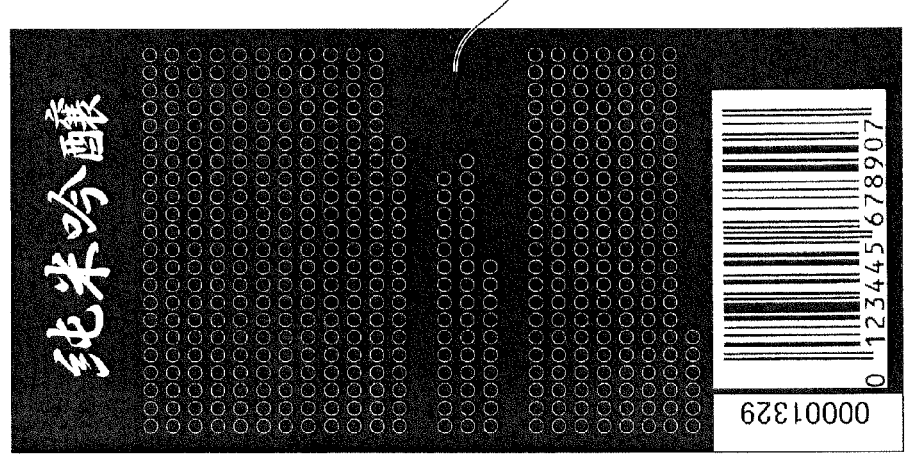
FIG. 1B is a plan view showing an RF tag according to a first embodiment of the present invention, i.e., an RF tag using a label to be attached to a container as a substrate of the tag, showing a state seen from a label front surface side.

FIGS. 1A and 1B are a plan view showing an RF tag 1 according to the first embodiment of the present invention in a configuration where a label to be attached to a container is used as a substrate 50 of the tag, 1A shows a state seen from a label back surface (attaching surface) side, and 1B shows a state seen from a label front surface side.

Figure 2:
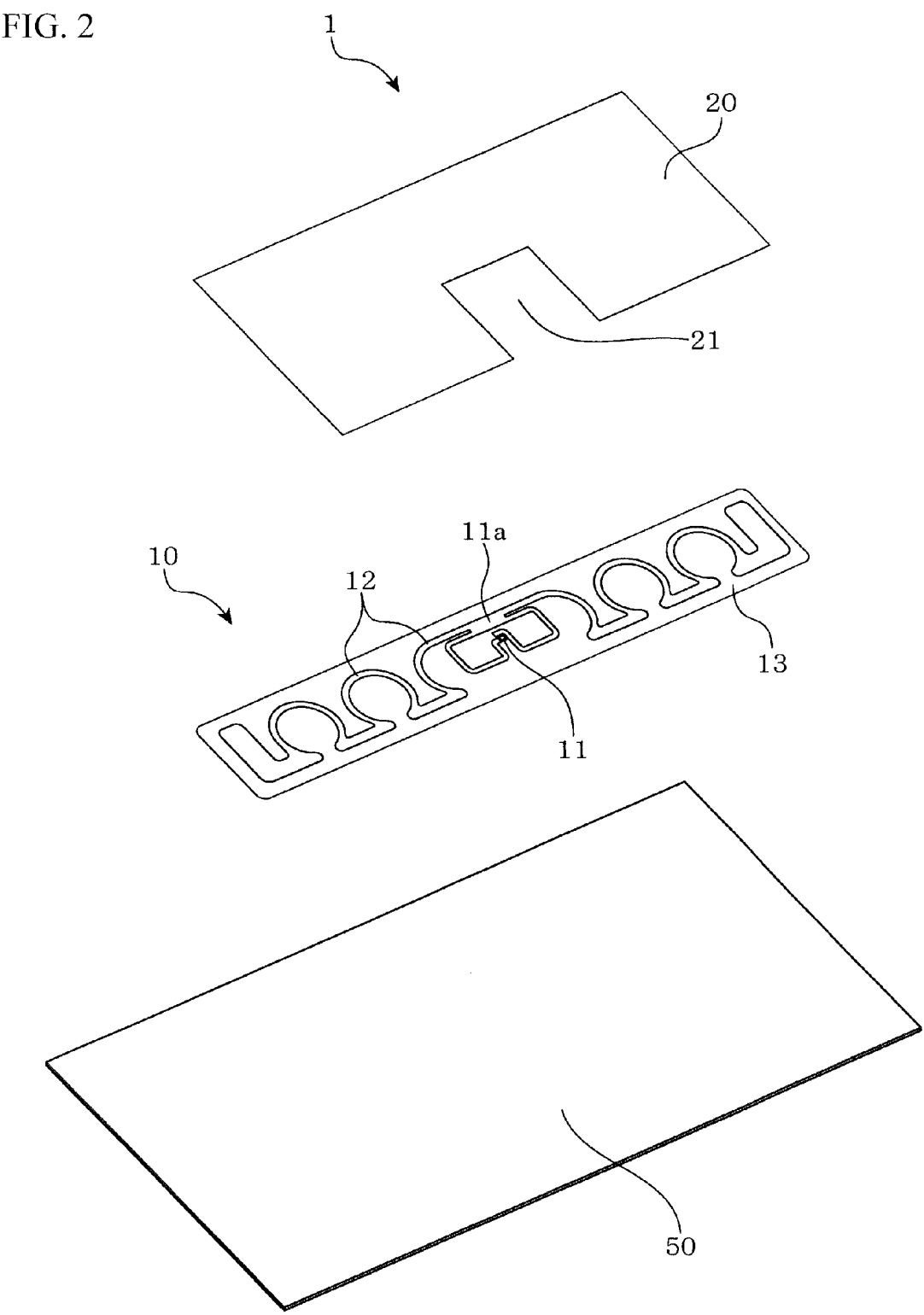
FIG. 2 is a perspective view of a state where an inlay, an auxiliary antenna and a substrate of the RF tag shown in FIG. 1A and FIG. 1B are exploded, and shows a state corresponding to FIG. 1A and seen from the label back surface (attaching surface) side.

Furthermore, FIG. 2 is a perspective view of a state where an inlay 10, an auxiliary antenna 20 and the substrate 50 of the RF tag 1 shown in FIG. 1A and FIG. 1B are exploded, and shows a state corresponding to FIG. 1A and seen from the label back surface (attaching surface) side.

As shown in these drawings, in the RF tag 1 according to the present embodiment, the planar auxiliary antenna 20 is laminated and disposed on the inlay 10 constituting the RF tag which performs a radio communication, and the inlay 10 and the auxiliary antenna 20 are laminated on the surface of the substrate 50 to constitute the RF tag 1.

Specifically, as shown in FIG. 2, the RF tag 1 of the present embodiment comprises the inlay 10 comprising an IC chip 11 and an antenna 12, the planar auxiliary antenna 20 laminated on the inlay 10 in an insulating state to the inlay, and the substrate 50 on which the inlay 10 and the auxiliary antenna 20 are laminated.

Furthermore, in the RF tag 1 according to the present embodiment, the auxiliary antenna 20 is formed into a predetermined shape and size corresponding to a communication frequency of the inlay 10, and the auxiliary antenna 20 is laminated and disposed at a predetermined position to the inlay 10 on the substrate 50.

Hereinafter, the respective parts will be described in detail.

[Inlay]

The inlay 10 constitutes the RF tag to perform reading, writing, or reading and writing of predetermined information between the RF tag and an unshown reader/writer (a reading/writing device) by radio, and there are types such as a read-only type, a write-once type and a read/write type.

Specifically, the inlay 10 has the IC chip 11 and the antenna 12 electrically conductively connected to the IC chip 11, and the IC chip 11 and the antenna 12 are mounted and formed on one sealing film 13 constituting a substrate and made of, e.g., a PET resin. Afterward, another sealing film 13 is superimposed thereon, so that the IC chip and the antenna sandwiched between the two sealing films 13 are sealed and protected.

In the present embodiment, the rectangular inlay 10 sandwiching and sealing the IC chip 11 and the antenna 12 extending on both sides of the IC chip 11 between the rectangular sealing films 13 is used.

The IC chip 11 is constituted of a semiconductor chip such as a memory, and can record data of, e.g., several hundred bits to several kilobits.

In the IC chip 11, a loop-like circuit conductor is connected so as to surround the chip, thereby forming a loop portion 11a, and the antenna 12 is connected to both the right and left sides of the IC chip 11 via the loop portion 11a.

Furthermore, the reading/writing (data calling, registration, deletion, update or the like) between the tag and the unshown reader/writer by a radio communication is performed via the antenna 12 and the after-mentioned auxiliary antenna 20, and the data recorded in the IC chip 11 is recognized.

As the data to be recorded in the IC chip 11, any data such as an identification code, name, weight, content quantity, manufacturer/seller name, manufacturing place, manufacturing date and use expiration date of a commodity can be recorded and can also be rewritten.

The antenna 12 is formed into a predetermined shape and size (length and area) on the surface of the one sealing film 13 constituting the substrate by etching processing or the like of, e.g., conductive ink or a metal thin film such as an aluminum vapor deposited film having a conductivity.

The sealing film 13 may be made of a film material such as polyethylene, polyethylene terephthalate (PET), polypropylene or polyimide having a flexibility, and the IC chip 11 and the antenna 12 which are to be sealed may be made of a transparent PET resin or the like visible from the outside. Furthermore, on the surface of the film on one surface side of the sealing film 13, a sticky layer or an adhesive layer can be deposited to enable attaching to the substrate or each article.

As a communication frequency band for use in the inlay 10, an 860 to 960 MHz band belonging to a so-called UHF band is picked up as a target in the RF tag 1 of the present embodiment.

In general, as the frequency band for use in the RF tag, there are several types of frequency bands, e.g., a zone of 135 kHz or less, a 13.56 MHz band, an 860 to 960 MHz band belonging to the UHF band, and a 2.45 GHz band. Furthermore, a communication distance enabling the radio communication varies with the frequency band for use, and an optimum antenna length or the like and a wiring pattern vary with the frequency band.

In the present embodiment, the inlay 10 can be miniaturized and the after-mentioned auxiliary antenna 20 can be formed into a predetermined size, and based on such a relation, the UHF band having a short wavelength and enabling the antenna to be miniaturized is picked up as a target. For example, a 953 MHz band or a 920 MHz band is picked up as the target, and in these frequency bands, suitable communication characteristics can be obtained.

However, when there is not any restriction on the size of the inlay 10 or the auxiliary antenna 20, needless to say, a technical idea according to the present invention in itself is also applicable to a frequency zone other than the UHF band.

[Auxiliary Antenna]

Figure 3A:
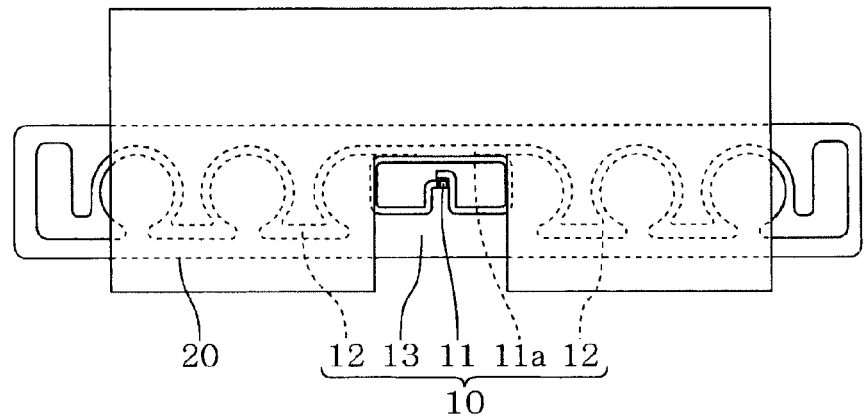
FIG. 3A is a plan view showing the inlay and the auxiliary antenna of the RF tag according to the first embodiment of the present invention, showing a state where the auxiliary antenna is laminated on the inlay.
Figure 3B:
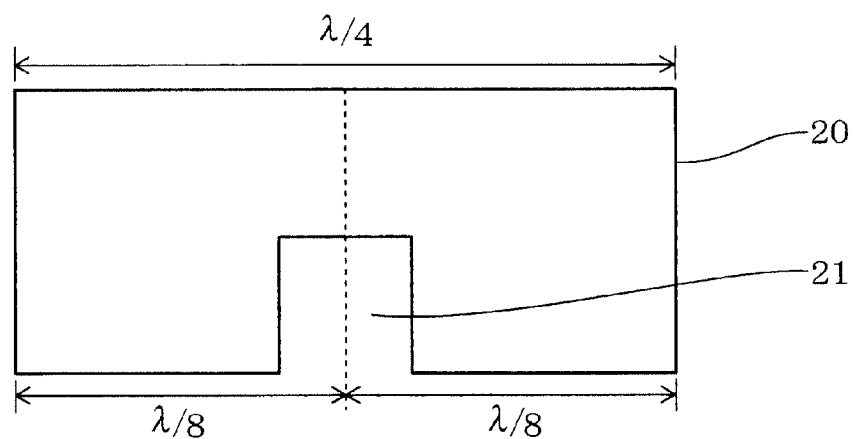
FIG. 3B is a plan view showing the inlay and the auxiliary antenna of the RF tag according to the first embodiment of the present invention, showing a dimensional relation between long sides of the auxiliary antenna.

The auxiliary antenna 20 functions as an extra antenna to improve and regulate the abovementioned communication characteristics of the inlay 10. Furthermore, as shown in FIG. 2, FIG. 3A, and FIG. 3B, the auxiliary antenna is constituted of a planar conductive member laminated and disposed on one surface side of the inlay 10, and has an insulating state to the inlay 10 sealed with the resin by the sealing film 13.

That is, the inlay 10 is entirely sealed with the resin by the sealing film 13, and physically has the insulating state to the auxiliary antenna 20 constituted of the conductive member. Furthermore, the auxiliary antenna 20 is directly laminated on the inlay 10, whereby the auxiliary antenna 20 is disposed to face the IC chip 11 of the inlay 10 via the sealing film 13, and electrically connected to the IC chip by so-called capacitor coupling.

Consequently, the auxiliary antenna 20 is laminated on the inlay 10 in a vertical direction (a height direction), and the antenna 12 of the inlay 10 and the auxiliary antenna 20 accordingly constitute a two-dimensional antenna. Therefore, the auxiliary antenna 20 functions as a booster of communication radio waves, so that the regulation and improvement of the communication characteristics of the inlay 10 are accomplished.

The auxiliary antenna 20 can be formed into a predetermined shape and size (length and area) on the surface of a film constituting a substrate made of, e.g., a PET resin by etching processing or the like of conductive ink or a metal thin film such as an aluminum vapor deposited film having a conductivity.

FIGS. 3A and 3B show a plan view of the auxiliary antenna according to the present embodiment, the drawing 3A shows a state where the auxiliary antenna is laminated on the inlay, and the drawing 3B shows a dimensional relation between long sides of the auxiliary antenna.

As shown in the drawing, in the present embodiment, the auxiliary antenna 20 is formed into a rectangular planar shape in which each short side is longer than that of the inlay 10 and each long side is slightly shorter than that of the inlay 10.

Furthermore, especially the long side of the rectangular shape is formed to have a length of substantially ¼ of a wavelength of a radio wave frequency of the inlay 10.

Furthermore, one of the long sides of the rectangular shape is provided with a cutout part 21 which divides the long side into two parts each having a length of substantially ⅛ of the wavelength of the radio wave frequency of the inlay 10.

The cutout part 21 is formed into a concave shape which is opened in an edge portion of the one long side of the auxiliary antenna 20 and has a predetermined width and depth to allow the IC chip 11 of the inlay 10 to be disposed therein.

First, according to a principle of a patch antenna, the auxiliary antenna 20 can be matched by setting the length of each long side of the auxiliary antenna to a length of ½, ¼ or ⅛ of the wavelength of the communication radio wave. On the other hand, the entire size of the RF tag 1 is defined by the length of the auxiliary antenna 20. For example, when the length is ½ of the wavelength, a dimension excessively lengthens (excessively enlarges), which might not be preferable in properties of the RF tag requested to be minimized.

Therefore, in the present embodiment, the length of the long side of the auxiliary antenna 20 is set to the length of substantially ¼ of the wavelength of the radio wave frequency of the inlay 10.

Further, in a case where the planar auxiliary antenna 20 is laminated on the inlay 10, when the auxiliary antenna 20 is superimposed and positioned on the IC chip 11 of the inlay 10, the communication characteristics of the IC chip 11 are impaired by the conductive member forming the auxiliary antenna 20.

That is, a loop circuit (the loop portion 11a) is formed in the vicinity of the IC chip 11 of the inlay 10, and the loop portion 11a has the purpose of matching an impedance and is disposed to perform a communication by a magnetic field component. Therefore, it is necessary to prevent this magnetic field component from being disturbed by a conductor of the auxiliary antenna 20.

Consequently, the cutout part 21 is formed so that the conductive member of the auxiliary antenna 20 is not present in a portion where the IC chip 11 is positioned, when the auxiliary antenna 20 is superimposed and laminated on the inlay 10.

Furthermore, when the cutout part 21 is formed, the cutout part 21 is formed at the position which divides the long side of the auxiliary antenna into two parts each having a length of substantially ⅛ of the wavelength of the radio wave frequency of the inlay 10 so that the length of substantially ¼ of the wavelength of the radio wave frequency of the inlay 10 which is the length of the long side of the auxiliary antenna 20 is changed to the length of substantially ⅛ of the wavelength of the frequency.

It is to be noted that there is not any special restriction on the size (the width and depth) of the cutout part 21, as long as the auxiliary antenna 20 is not superimposed on at least the IC chip 11 of the inlay 10. Furthermore, when the width and depth of the cutout part 21 are suitably regulated, the matching of the impedance can be accomplished in accordance with the radio wave frequency of the IC chip 11, a material of an after-mentioned case 50, an influence from each article to which the RF tag 1 is attached, or the like.

Consequently, there is not any special restriction on the cutout part 21, as long as the cutout part has a size to allow at least the IC chip 11 to be disposed therein and the width and depth of the cutout part can suitably be regulated and changed within a range of the size of the auxiliary antenna 20.

More specifically, for example, when the communication frequency of the inlay 10 is 953 MHz, $\lambda$, nearly equals 314.8 mm, $\lambda/4$ nearly equals 78.7 mm, and $\lambda/8$ nearly equals 39.4 mm.

Therefore, the auxiliary antenna 20 is formed so that the length of each long side is around 78.7 mm, whereby one long side provided with the cutout part 21 is divided into two parts each having a length of around 39.4 mm.

Furthermore, for example, when the communication frequency of the inlay 10 is 920 MHz, $\lambda$ nearly equals 326.0 mm, $\lambda/4$ nearly equals 81.5 mm, and $\lambda/8$ nearly equals 40.8 mm.

Therefore, the auxiliary antenna 20 is formed so that the length of each long side is around 81.5 mm, whereby one long side provided with the cutout part 21 is divided into two parts each having a length of around 40.8 mm.

It is to be noted that the inlay is usually constituted of two layers of the antenna+a PET layer constituting the substrate (a UHF tag) or three layers further including an impedance regulation antenna under the PET layer.

Therefore, also in the inlay 10 according to the present embodiment, a structure including the PET layer sandwiched between the auxiliary antenna 20 as the conductor and the antenna 12 of the inlay 10 produces a wavelength shortening effect. When this PET layer is utilized, an apparent wavelength is shortened. A specific dielectric constant of PET is about "4".

In consequence, the length of the long side of the auxiliary antenna 20 in the present embodiment also has an approximate value, and the value of about $\lambda/4$ or about $\lambda/8$ is sufficient. Therefore, the length varies sometimes in accordance with a change of the communication characteristics due to a material of the case 50 of the RF tag 1, or a use environment, a use configuration or the like of the tag.

Furthermore, the cutout part 21 is formed in the auxiliary antenna 20 on the basis of a dimension of the inlay 10 for use, and a width and depth of the cutout part are set so that the conductive member of the auxiliary antenna 20 is not superimposed on the portion of the IC chip 11 of the inlay 10.

Specifically, first, the width of the cutout part 21 is set on the basis of a width of the loop portion 11a of the IC chip 11 of the inlay 10, and a size of the cutout part is set so that the conductor of the auxiliary antenna 20 is not superimposed on the IC chip 11 and the loop portion 11a or so that the conductor is not superimposed on the IC chip 11 but is superimposed on a part of a peripheral edge of the loop portion 11a. For example, when a size of the width of the loop portion 11a is from about 15 to 18 mm, the width of the cutout part 21 is a length in a range of about 10 to 20 mm.

Furthermore, the depth of the cutout part 21 is set on the basis of the width of the inlay 10 (a length of a short direction) and a position of an upper portion of the loop portion 11a so that the antenna conductor is not superimposed on at least the IC chip 11. For example, when the width of the inlay 10 is from about 10 to 30 mm, the depth of the cutout part 21 is a length in a range of about 5 to 20 mm.

It is to be noted that when the data is read from and written in the inlay 10, a current flowing through the auxiliary antenna 20 only flows through a peripheral edge portion of the planar auxiliary antenna 20 (skin effect).

According to one or more embodiments, the auxiliary antenna 20 has a concave peripheral edge outer shape having the cutout part 21 described above, and in this case, a flat surface portion can be formed in, e.g., a mesh or lattice state.

Figure 4:
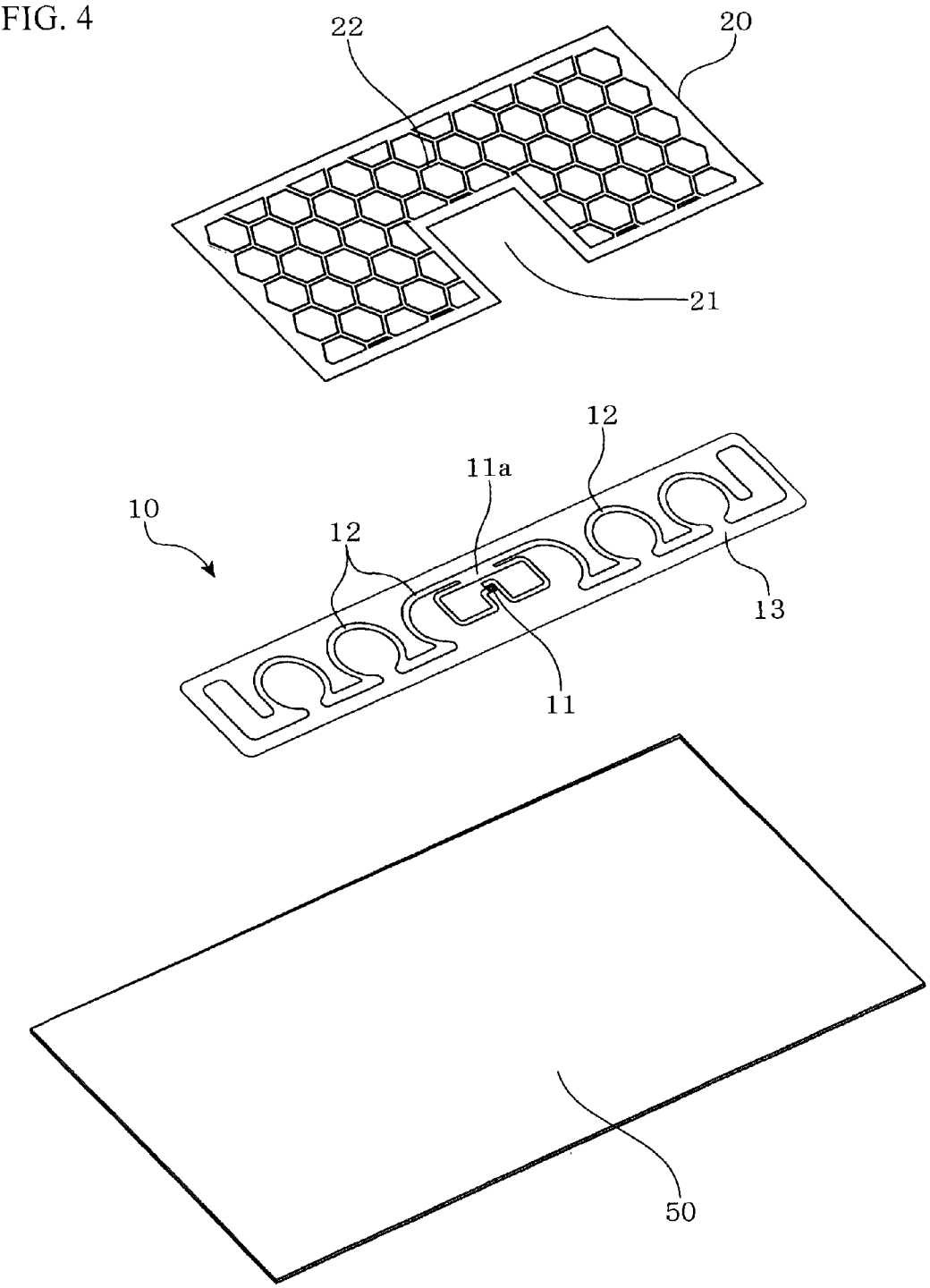
FIG. 4 is a perspective view showing the RF tag in which another auxiliary antenna is formed in a mesh state according to the first embodiment of the present invention in the state where the inlay, the auxiliary antenna and the substrate are exploded, corresponding to FIG. 1A and showing the state seen from the label back surface (attaching surface) side.

FIG. 4 is an exploded perspective view showing a configuration where the auxiliary antenna 20 is formed in the mesh state.

As shown in the drawing, the auxiliary antenna 20 is formed in the mesh state or the like, so that a function of the antenna is not impaired by the skin effect. Furthermore, an area of the whole conductor portion of the auxiliary antenna 20 can be reduced, and a conductor material such as the conductive ink forming the auxiliary antenna 20 can be saved, which can accomplish further cost reduction of the RF tag 1.

[Substrate]

The substrate 50 is a sheet-like or film-like member constituting base paper or the substrate on which the inlay 10 and the auxiliary antenna 20 described above are laminated.

Figure 5:
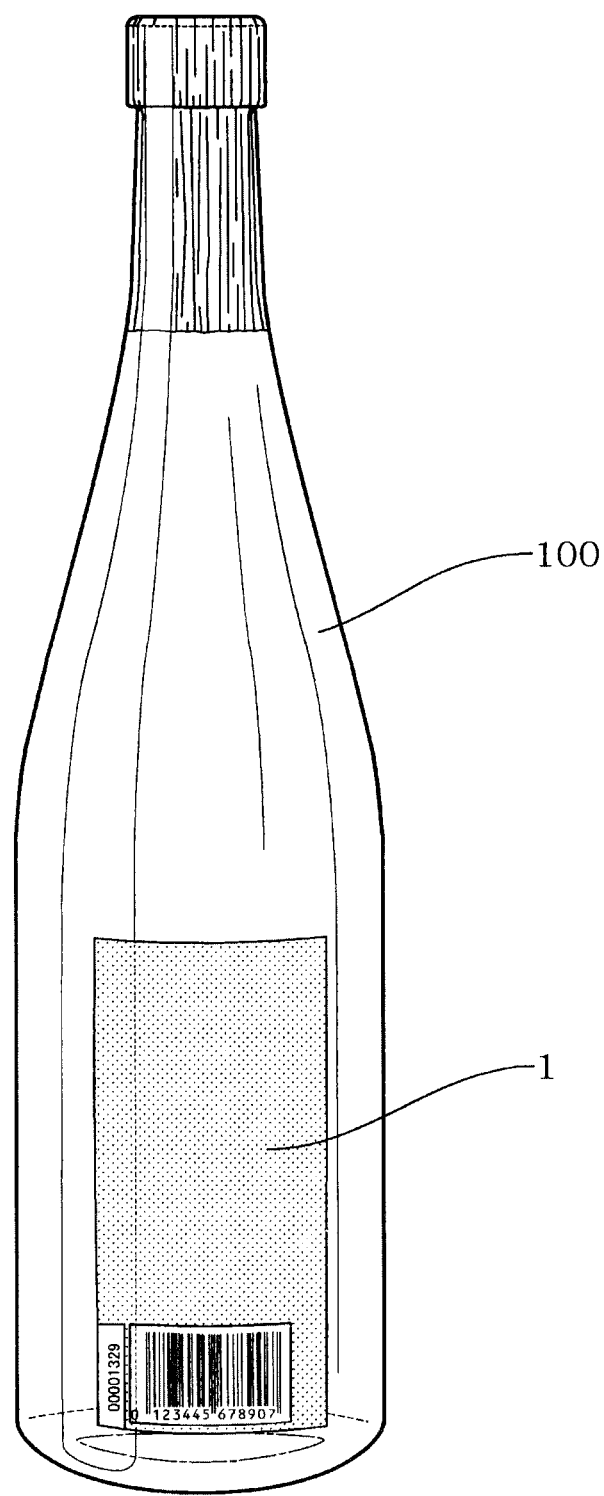
FIG. 5 is an appearance view of a container to whose surface (bottle back surface) a label constituting the RF tag according to the first embodiment of the present invention is attached.

In the present embodiment, as shown in FIG. 1 and FIG. 5, the substrate 50 is constituted of a label sheet to be attached to the surface of a beverage bottle such as a bottle 100, a beverage container or the like, and the inlay 10 and the auxiliary antenna 20 are laminated on a beverage bottle attaching surface side of the label sheet.

FIG. 5 is an appearance view of the bottle 100 to whose surface (a bottle back surface) a label constituting the RF tag 1 according to the present embodiment is attached.

As shown in FIG. 1A and FIG. 5, the substrate 50 is formed into a rectangular sheet which is one size larger than an outer shape of the laminated inlay 10 and auxiliary antenna 20, so as to completely cover the laminated and arranged inlay 10 and auxiliary antenna 20.

Furthermore, on one surface side of the substrate 50, specifically on the side of the surface (the bottle attaching surface or the label back surface) of the label sheet constituting the substrate 50 which faces the surface of the bottle 100, the inlay 10 and the auxiliary antenna 20 are laminated and arranged.

On the other hand, on the side of the other surface (a label front surface) of the substrate 50, predetermined information (a content name, a type, a place of production, ingredients, a country name, a price, a barcode, etc.) on a content to be charged into the bottle 100 is displayed by printing or the like (see FIG. 1B).

Here, the substrate 50 can be formed by using a sheet material or a film material having a flexibility and made of, e.g., paper or synthetic paper, or a resin such as polyethylene, polyethylene terephthalate (PET), polypropylene or polyimide.

Furthermore, the substrate 50 is disposed and secured to the surface of the bottle 100 so that the label back surface side on which the inlay 10 and the auxiliary antenna 20 are arranged is attached to the surface of the bottle 100 via an adhesive or the like and so that the substrate does not easily peeled off.

In consequence, the inlay 10 and the auxiliary antenna 20 arranged on the label back surface of the substrate 50 are entirely covered with the substrate 50 and are protected from an impact from the outside, an environmental change or the like and can function as the RF tag.

Furthermore, the inlay 10 and the auxiliary antenna 20 are hidden behind the substrate 50, and therefore are not exposed to the surface of the bottle 100, so that it is not found from the outside that the inlay 10 and the auxiliary antenna 20 are arranged on the label to constitute the RF tag 1.

Therefore, the presence of the RF tag 1 is not found, and the peeling, breakdown or the like can effectively be prevented from being performed to the RF tag 1.

[Communication Characteristics]

The communication characteristics of the RF tag 1 according to the present embodiment having the abovementioned constitution will now be described with reference to FIG. 6A, FIG. 6B, and FIG. 7.

Figure 6A:
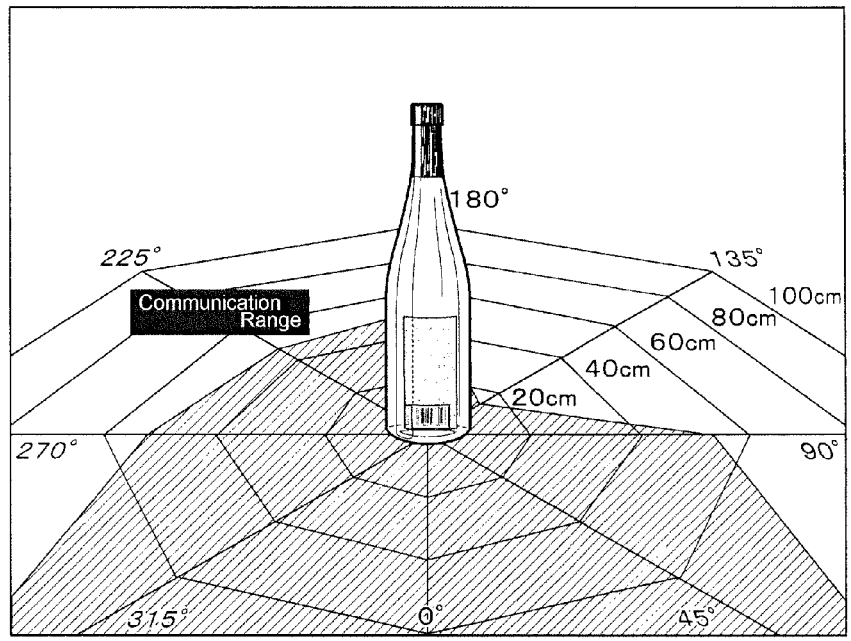
FIG. 6A is an explanatory view showing a communication distance and a communication range of the RF tag according to the first embodiment of the present invention, showing the RF tag according to the present invention.
Figure 6B:
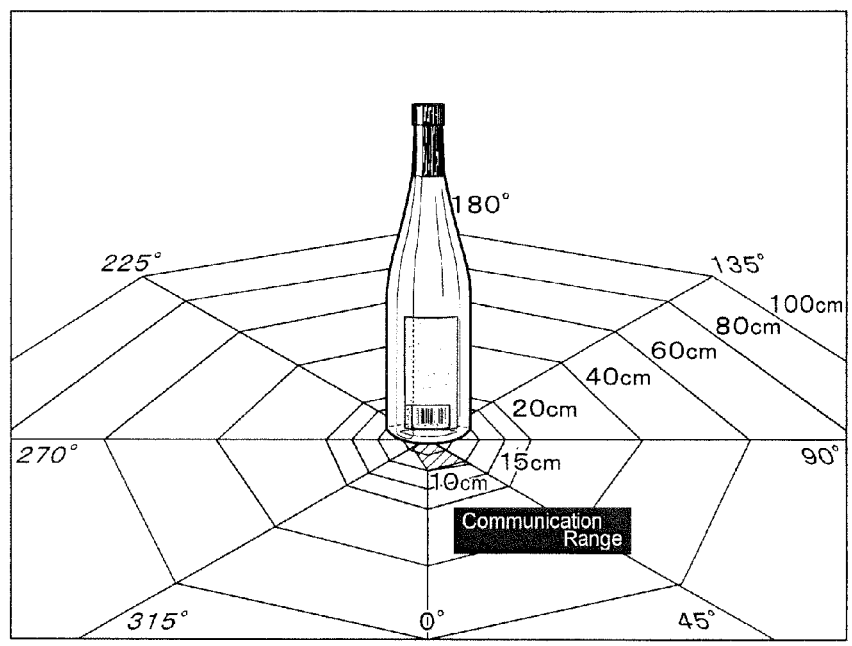
FIG. 6B is an explanatory view showing a communication distance and a communication range of the RF tag according to the first embodiment of the present invention, showing a conventional RF tag.

FIGS. 6A and 6B are an explanatory view showing a communication distance and a communication range of the RF tag 1 according to the present embodiment. FIG. 6A shows the RF tag according to one or more embodiments of the present invention, and FIG. 6B shows a conventional RF tag.

In the drawing, a region shown by hatching shows a readable distance and range (angle) in a case where the data recorded in the RF tag attached to the surface of the container is read by the reader/writer, and schematically shows a readable distance and range (angle) in a case where a position at which the reader/writer faces the label (the RF tag) is rotated by 360° in a rotating direction, when a position at which the reader/writer faces the front of the label (the RF tag) is 0°.

It is to be noted that here, the RF tag 1 is described in a case where the reader/writer having a communication frequency of 920 MHz and an output of 27 dBm is used.

In the RF tag 1 according to the present embodiment shown in FIG. 6A, it is seen that the data can be read by the reader/writer in all of the 360° rotating direction on the basis of 0° of the front of the label (the RF tag 1).

Additionally, it is seen that the communication distance at which the data can be read by the reader/writer is a communication distance of 100 cm or more in a forward range of 315° to 45° on a front side of the label (the RF tag 1), and is a communication distance of 50 cm or more also at a position from a directly horizontal direction of 90° or 270° to a right behind direction of 180° of the label (the RF tag 1).

Furthermore, it is seen that the communication distance is around 10 cm also at a diagonally backward position of 135° of the label (the RF tag 1) where the communication distance is shortest and that the data can be read by the reader/writer in the whole circumferential direction of 360° of the container.

On the other hand, in the conventional RF tag shown in FIG. 6B, the auxiliary antenna 20 according to the present embodiment is not disposed. In this case, it is seen that the data can be read by the reader/writer in a front forward range of 0° to 45° of the label (the RF tag 1), but the data cannot be read in a range of 45° to 315° excluding the above range.

Furthermore, as the communication distance, a communication distance of around 10 cm is only obtained in the front forward range of 0° to 45° of the label (the RF tag 1) from which the data can be read by the reader/writer and that the data cannot be read at all in the other range.

Next, to compare the RF tag 1 of the present embodiment described above with the conventional RF tag, the data was read by the reader/writer in a state where the bottles 100 to each of which the RF tag was attached were packed and received in a box for six bottles.

Figure 7:
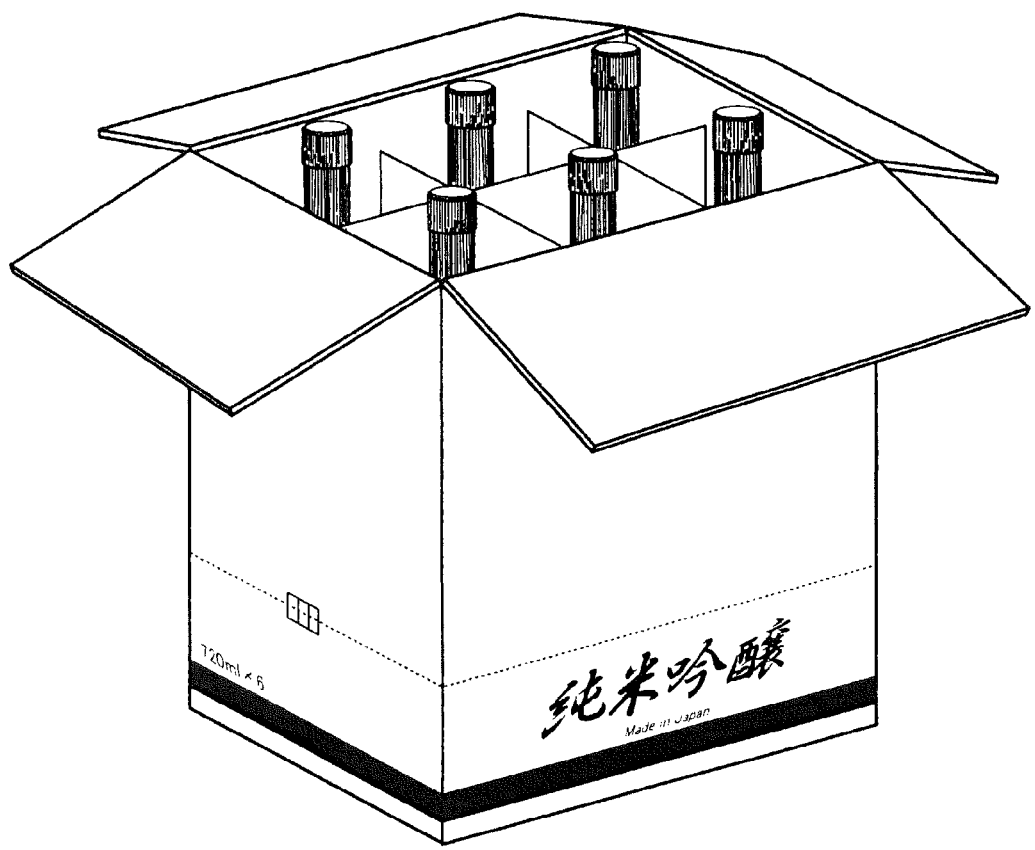
FIG. 7 is an appearance view of a state where a plurality of containers (six bottles) to each of which the label constituting the RF tag according to the first embodiment of the present invention is attached are simultaneously packaged and packed in a box.

Furthermore, FIG. 7 is an appearance view of the state where a plurality of (six) bottles 100 to each of which the label constituting the RF tag 1 according to the present embodiment (or the conventional RF tag) is attached are simultaneously packed in the box and packaged.

As shown in the drawing, when the data was read from the bottles 100 packed in the box by the reader/writer and when the RF tag 1 according to the present embodiment shown in FIG. 6A was attached to each of the bottles packed in the box, a reading ratio by the reader/writer was a reading ratio of 99.3% in a range of a communication distance of 50 cm, and when the reading was performed as much as a plurality of times while changing a direction of each of the bottles 100 in the box, the reading ratio reached 100%.

It is seen from this fact that the RF tag 1 according to the present embodiment effectively functions as an RF tag so that the data of the individual RF tag 1 is read by the reader/writer even in the state where the plurality of (six) bottles 100 are packed in the box.

On the other hand, in the bottles to each of which the conventional RF tag shown in FIG. 6B is attached and which are packed in the box, the reading ratio by the reader/writer has an upper limit of 35%, and the reading is only performed in a range of a communication distance of about 3 cm.

It is seen from this fact that the conventional RF tag cannot function as the RF tag in the state where the plurality of (six) bottles 100 are packed in the box.

Therefore, for example, also in a case where a plurality of/a large amount of/many types of containers are managed to perform shipping processing or the like, when the RF tags 1 of the present embodiment are used, product management mistakes can noticeably be decreased. Furthermore, product management during the shipping from a warehouse remarkably becomes easy, and shortening of working hours, enhancement of a commodity (brand) value and the like can be accomplished.

As described above, according to the RF tag 1 of the first embodiment of the present invention, the auxiliary antenna 20 laminated and disposed on the inlay 10 in the insulating state to the inlay is formed into the rectangular planar shape, and the outer shape or size of the planar auxiliary antenna 20 is set to the predetermined size corresponding to the communication frequency zone of the inlay 10. That is, the length of each long side of the rectangular surface constituting the auxiliary antenna 20 is set to the length of substantially ¼ of the wavelength of the radio wave frequency of the inlay 10, and one of the long sides of the rectangular shape is provided with the cutout part 21 which divides the long side into two parts each having the length of substantially ⅛ of the wavelength of the radio wave frequency of the inlay 10. Furthermore, the cutout part 21 is formed into the concave shape having the predetermined width and depth to allow the IC chip 11 of the inlay 10 to be disposed therein.

When the auxiliary antenna 20 is designed as described above, the communication characteristics of the inlay 10 can be regulated in accordance with the communication frequency of the inlay 10 on which the auxiliary antenna 20 is laminated, and the communication characteristics of the inlay 10 can be set and regulated into an optimum state in accordance with the frequency zone.

Therefore, for example, when the outer shape and area of the auxiliary antenna 20 are set in accordance with the type or communication characteristics of the inlay 10, the communication characteristics optimum for the inlay 10 can be obtained, and the communication distance to the reader/writer can be lengthened. Furthermore, it is possible to cope with a different communication frequency only by changing the auxiliary antenna 20, and versatility and expandability of the RF tag can be improved.

Consequently, even when the inlay 10 for use in the RF tag 1 is changed, suitable communication characteristics corresponding to the respective communication frequencies can be obtained, a sufficient communication distance can be acquired, and an influence of water or a metal can effectively be avoided or reduced. Furthermore, the long communication distance can be acquired, and hence the data can collectively be read from the plurality of RF tags 1 even when the RF tags 1 are attached to a plurality of articles, respectively.

Therefore, for example, also when the plurality of containers are collectively packed in the box and conveyed, the RF tags 1 attached to the containers can be read, respectively. In consequence, it is possible to realize the RF tag suitable for commodity management or the like during the shipping of the container containing the contents or export/import thereof.

Furthermore, the auxiliary antenna 20 is set in accordance with the communication frequency of the inlay 10. In this case, for example, also in a foreign country such as the U.S. where frequencies different from those of Japan are used at present, the RF tag 1 can be adapted for each district by setting and changing the auxiliary antenna 20 so that it is possible to cope with the frequencies.

Therefore, when the IC chip 11 and the antenna 12 constituting the inlay 10 vary to use the different communication frequency or when the inlay 10 constituted of the same IC chip 11 and the same antenna 12 is used in, e.g., the country or the district where the usable communication frequency zone is different, it is possible to cope with this difference by changing and regulating the auxiliary antenna 20, and the versatility and expandability of the RF tag can remarkably be improved.

Second Embodiment

Next, a second embodiment of the RF tag according to the present invention will be described with reference to FIGS. 8 to 11.

Figure 8A:
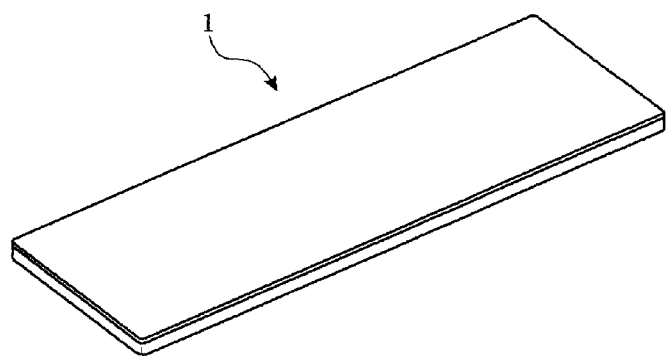
FIG. 8A is an appearance perspective view showing an RF tag according to a second embodiment of the present invention, showing a completed state of the RF tag.
Figure 8B:
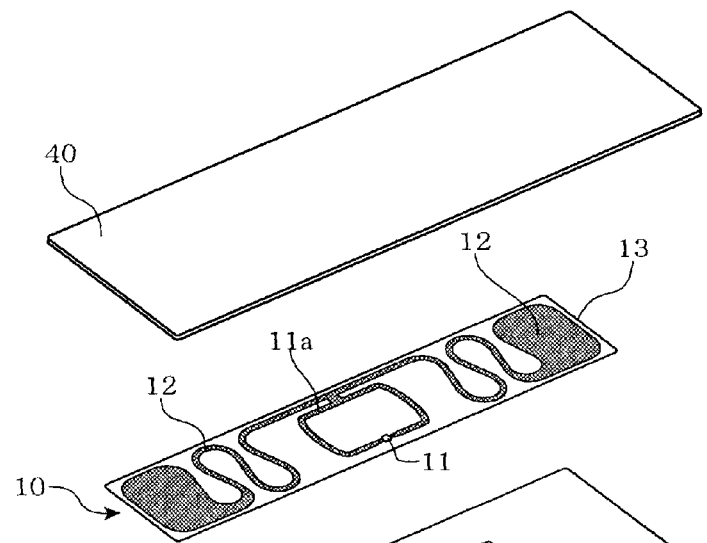
FIG. 8B is an appearance perspective view showing an RF tag according to a second embodiment of the present invention, showing a state where a surface layer, an inlay, an auxiliary antenna and a substrate constituting the RF tag are exploded.
Figure 8B:
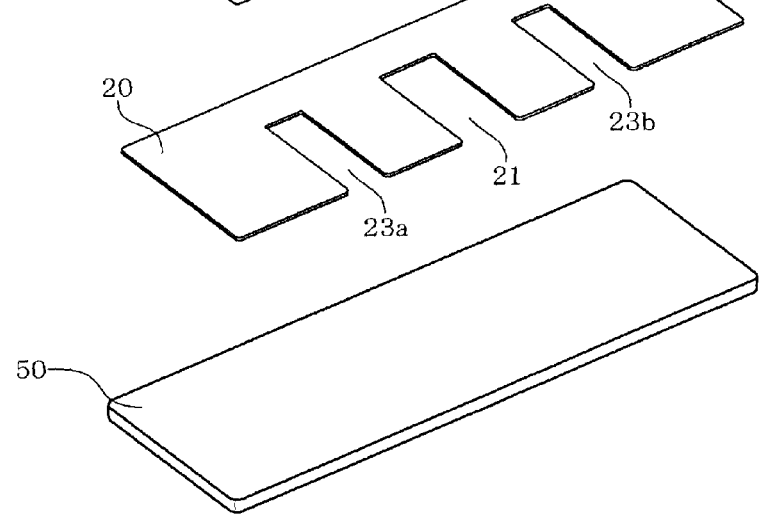

FIGS. 8A and 8B are an appearance view showing the RF tag according to the second embodiment of the present invention, 8A shows a perspective view of a completed state of the RF tag, and 8B shows a perspective view of a state where a surface layer, an inlay, an auxiliary antenna and a substrate constituting the RF tag are exploded.

As shown in the drawing, in the same manner as in the RF tag 1 according to the first embodiment, in a RF tag 1 according to the present embodiment, an inlay 10 and a planar auxiliary antenna 20 constituting the RF tag to perform a radio communication are arranged in a laminated state, and the inlay 10 and the auxiliary antenna 20 are mounted on the surface of a substrate 50 and covered and protected by a surface layer 40 to constitute the RF tag 1.

Figure 10:
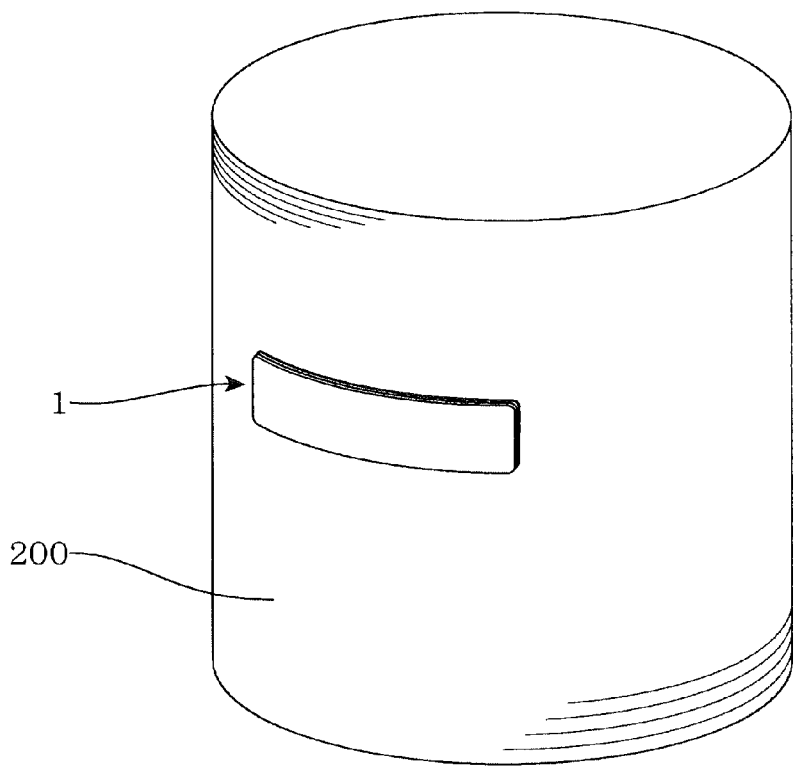
FIG. 10 is an appearance view of a state where the RF tag according to the second embodiment of the present invention is attached to a surface (a curved surface) of an object.

Furthermore, the RF tag 1 according to the present embodiment can be attached to and used on a curved surface portion of, e.g., each metal container made of aluminum, or each metal article having a gently curved shape, e.g., each heater including a case made of a metal as shown in FIG. 10.

Specifically, as shown in FIGS. 8A and 8B, the RF tag 1 according to the present embodiment includes the inlay 10 provided with an IC chip 11 and an antenna 12, the planar auxiliary antenna 20 on which the inlay 10 is laminated in an insulating state, the substrate 50 which constitutes a substrate layer including the laminated inlay 10 and auxiliary antenna 20 mounted thereon, and functions as a dielectric constant regulation layer to the mounted inlay 10, and the surface layer 40 which constitutes a cover to cover the inlay 10 and the auxiliary antenna 20 mounted and laminated on the substrate 50.

Furthermore, in the RF tag 1 according to the present embodiment, the auxiliary antenna 20 is formed into a predetermined shape and size corresponding to a communication frequency of the inlay 10, and the auxiliary antenna 20 is laminated and disposed at a predetermined position to the inlay 10 on the substrate 50 having a predetermined softness and flexibility and a predetermined specific dielectric constant.

Hereinafter, the respective parts will be described in detail.

[Inlay]

As described above in the first embodiment, the inlay 10 has the IC chip 11 and the antenna 12 electrically conductively connected to the IC chip 11, and the IC chip 11 and the antenna 12 are mounted and formed on one sealing film 13 constituting a substrate and made of, e.g., a PET resin. Afterward, another sealing film 13 is superimposed thereon, so that the IC chip and the antenna sandwiched between the two sealing films 13 are sealed and protected.

Also in the present embodiment, similarly to the first embodiment, the rectangular inlay 10 sandwiching and sealing the IC chip 11 and the antenna 12 extending on both sides of the IC chip 11 between the rectangular sealing films 13 is used.

Here, in the RF tag 1 of the present embodiment, as a communication frequency band for use in the inlay 10, a 920 MHz band (915 to 930 MHz: a 15 MHz width) belonging to a so-called UHF band is picked up as a target.

As described also in the first embodiment, as the frequency band for use in the RF tag, there are several types of frequency bands, e.g., a band of 135 kHz or less, a 13.56 MHz band, an 860 to 960 MHz band belonging to the UHF band, and a 2.45 GHz band. Furthermore, a communication distance enabling the radio communication varies with the frequency band for use, and an optimum antenna length or the like and a wiring pattern vary with the frequency band.

Furthermore, for example, in Japan, a frequency band of the RF tag has been shifted from a heretofore used 950 MHz band (950 to 958 MHz: an 8 MHz width) to a 920 MHz band (915 to 930 MHz: a 15 MHz width) by the revision of the Radio Wave Law, and hence a utilizable frequency band has been enlarged.

Additionally, in the present embodiment, the inlay 10 can be miniaturized and the after-mentioned auxiliary antenna 20 can be formed in a predetermined size, and based on such a relation, the UHF band having a short wavelength and enabling the antenna to be miniaturized is picked up as a target. Specifically, the 920 MHz band is picked up as the target, and in this 920 MHz band, suitable communication characteristics can be obtained.

However, when there is not any restriction on the size of the inlay 10 or the auxiliary antenna 20, needless to say, a technical idea according to one or more embodiments of the present invention in itself is also applicable to a frequency zone other than the 920 MHz band and the UHF band.

[Auxiliary Antenna]

The auxiliary antenna 20 functions as an extra antenna to improve and regulate the communication characteristics of the inlay 10 as described above in the first embodiment. Furthermore, as shown in FIGS. 8A, 8B, the auxiliary antenna is constituted of a planar conductive member laminated and disposed on one surface side of the inlay 10, and has an insulating state to the inlay 10 sealed with the resin by the sealing film 13.

Figure 9A:
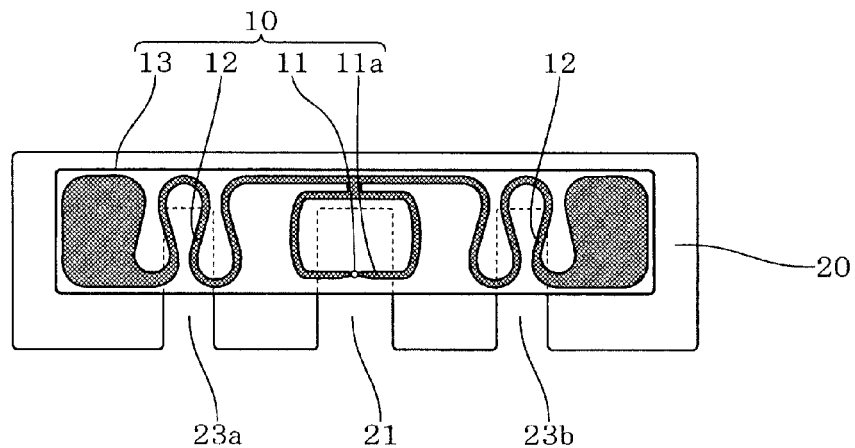
FIG. 9A is a plan view showing the auxiliary antenna of the RF tag according to the second embodiment of the present invention, showing a state where the inlay is laminated on the auxiliary antenna.
Figure 9B:
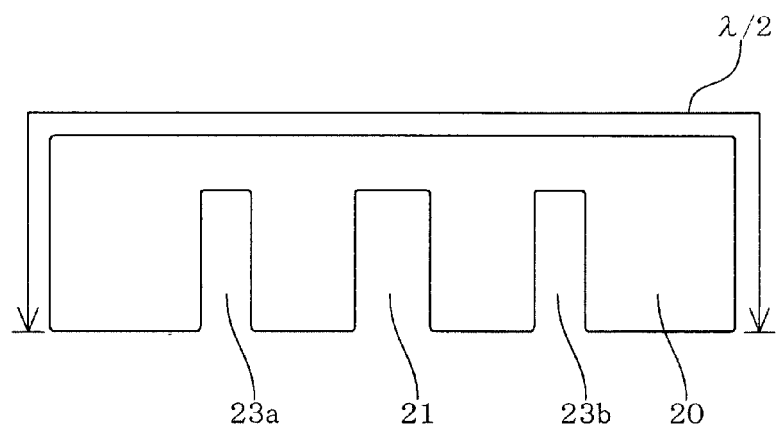
FIG. 9B is a plan view showing the auxiliary antenna of the RF tag according to the second embodiment of the present invention, showing a dimensional relation between a long side and a short side of the auxiliary antenna.
Figure 9C:
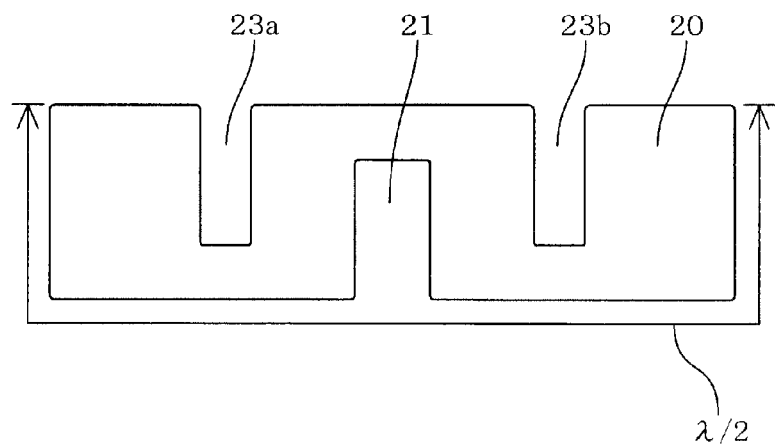
FIG. 9C is a plan view showing the auxiliary antenna of the RF tag according to the second embodiment of the present invention, showing a dimensional relation between a long side and a short side of the auxiliary antenna.

FIGS. 9A, 9B and 9C show a plan view of the auxiliary antenna according to the present embodiment, the drawing 9A shows a state where the inlay 10 is laminated on the auxiliary antenna 20, and the drawings 9B, 9C show a dimensional relation between long sides of the auxiliary antenna.

As shown in the drawing, in the present embodiment, the auxiliary antenna 20 is formed into a rectangular planar shape in which each long side and each short side are longer than those of the inlay 10 and which is one size larger than the inlay 10.

Furthermore, the auxiliary antenna 20 is formed so that especially a pair of facing short sides and one long side adjacent to this pair of short sides of the rectangular shape have a length of substantially ½ of a wavelength of a radio wave frequency of the inlay 10.

Furthermore, a central portion of one of the long sides of the rectangular shape is provided with a (central) cutout part 21 formed into a concave shape which is opened in an edge portion of the long side and has a predetermined width and depth to allow the IC chip 11 of the inlay 10 to be disposed therein.

Furthermore, one of the long sides or the other long side of the rectangular shape is provided with a pair of (left and right) cutout parts 23a, 23b opened in the edge portion of the long side on both sides sandwiching the (central) cutout part 21.

First, as described in the first embodiment, according to a principle of a patch antenna, the auxiliary antenna 20 can be matched by setting the length of each long side of the auxiliary antenna to a length of ½, ¼ or ⅛ of the wavelength of the communication radio wave.

Furthermore, the entire size (length) of the RF tag 1 is substantially defined by the length of the auxiliary antenna 20. For example, when the length of the auxiliary antenna 20 is set to the length of ½ of the wavelength, the entire size (length) of the RF tag 1 is a length of substantially ½ of the wavelength, or little larger (longer) than the length.

In this respect, the excessively long (the excessively large) entire length of the tag might not be preferable in properties of the RF tag requested to be minimized.

In the present embodiment, a length of the three sides of adjacent short side, long side and short side of the auxiliary antenna 20 is set to a length of substantially ½ of the wavelength of the radio wave frequency of the inlay 10, and further, the one or other long side is provided with left and right, i.e., a pair of (left and right) cutout parts 23a, 23b.

According to such a constitution, the auxiliary antenna 20 is equivalent to an antenna having a length of substantially ½ of the wavelength of the radio wave frequency of the inlay 10 and having both ends thereof bent, and hence suitable communication characteristics can be obtained.

Specifically, when the communication frequency of the inlay 10 is 920 MHz as the target picked up in the present embodiment, λ nearly equals 326.0 mm, and λ/2 nearly equals 163.0 mm. Therefore, the auxiliary antenna 20 is formed so that a total length of the three sides of the long side and both the adjacent short sides is around 163.0 mm.

It is to be noted that the (left and right) cutout parts 23a, 23b may be formed in such a size as to expose a part of the antenna 12 of the inlay 10, and a width and depth of each cutout part can be set and regulated in a predetermined range in accordance with the inlay 10 for use.

Furthermore, as described in the first embodiment, in a case where the planar auxiliary antenna 20 is laminated on the inlay 10, when the auxiliary antenna 20 is superimposed and positioned on the IC chip 11 of the inlay 10, the communication characteristics of the IC chip 11 are impaired by the conductive member forming the auxiliary antenna 20. That is, a loop circuit (a loop portion 11a) is formed in the vicinity of the IC chip 11 of the inlay 10, and the loop portion 11a has the purpose of matching an impedance and is disposed to perform a communication by a magnetic field component. Therefore, it is necessary to prevent this magnetic field component from being disturbed by a conductor of the auxiliary antenna 20.

Consequently, the (central) cutout part 21 is formed so that the conductive member of the auxiliary antenna 20 is not present in a portion where the IC chip 11 is positioned, when the auxiliary antenna 20 is superimposed and laminated on the inlay 10.

The (central) cutout part 21 is substantially formed in the center of the one long side of the auxiliary antenna 20 so that the IC chip 11 of the inlay 10 is not superimposed on a conductor portion of the auxiliary antenna 20 and so that the conductor portion of the auxiliary antenna 20 is not superimposed on a part (or all) of the loop portion 11a of the inlay 10.

Furthermore, when a width (frontage) and a depth (deepness) of the (central) cutout part 21 are appropriately set, an effective area of the loop portion 11a of the IC chip 11 can be regulated (changed), and the impedance matching of the loop portion 11a can be accomplished.

It is to be noted that there is not any special restriction on the size (the width and depth) of the (central) cutout part 21, as long as the auxiliary antenna 20 is not superimposed on at least the IC chip 11 of the inlay 10. Furthermore, when the width and depth of the (central) cutout part 21 are suitably regulated, the impedance matching can be accomplished in accordance with the radio wave frequency of the IC chip 11, a material of the after-mentioned substrate 50, an influence from each article to which the RF tag 1 is attached, or the like.

Consequently, there is not any special restriction on the (central) cutout part 21, as long as the cutout part has a size to allow at least the IC chip 11 to be disposed therein and the width and depth of the cutout part can suitably be regulated and changed within a range of the size of the auxiliary antenna 20.

Furthermore, the (central) cutout part 21 and the (left and right) cutout parts 23a, 23b may be formed in any long side of the auxiliary antenna 20, and as shown in FIGS. 9B, 9C, the three cutout parts 21, 23a and 23b can be formed on the same long side of the auxiliary antenna 20 (see FIG. 9B), or the (central) cutout part 21 and the (left and right) cutout parts 23a, 23b can be formed on different long sides, respectively (see FIG. 9C).

Here, also in the inlay 10 according to the present embodiment, a structure including a PET layer sandwiched between the auxiliary antenna 20 as the conductor and the antenna 12 of the inlay 10 produces a wavelength shortening effect in the same manner as in the first embodiment. When this PET layer is utilized, an apparent wavelength is shortened. A specific dielectric constant of PET is about "4".

In consequence, the length of the three sides including the long side and both the adjacent short sides of the auxiliary antenna 20 in the present embodiment also has an approximate value, and the value of about λ/2 is sufficient. Therefore, the length varies sometimes in accordance with a change of the communication characteristics due to the material or dielectric constant of the substrate 50 of the RF tag 1, or a use environment, a use configuration or the like of the tag.

Therefore, the auxiliary antenna 20 can be formed so that, for example, the length of the long side is 82 mm, the length of the short side is 25 mm, and the length of the three sides including the long side and both the adjacent short sides is 132 mm.

Furthermore, the cutout parts 21, 23a and 23b are formed in the auxiliary antenna 20 on the basis of a dimension of the inlay 10 for use, and a width and depth of each cutout part are set so that the conductive member of the auxiliary antenna 20 is not superimposed on the portion of the IC chip 11 of the inlay 10, in the same manner as in the cutout part 21 of the first embodiment.

Specifically, first, the width of the (central) cutout part 21 is set on the basis of a width of the loop portion 11a of the IC chip 11 of the inlay 10, and a size of the cutout part is set so that the conductor of the auxiliary antenna 20 is not superimposed on the IC chip 11 and the loop portion 11a or so that the conductor is not superimposed on the IC chip 11 but is superimposed on a part of a peripheral edge of the loop portion 11a. For example, when a size of the width of the loop portion 11a is from about 10 to 15 mm, the width of the cutout part 21 is a length in a range of about 8 to 10 mm (e.g., 9 mm described above).

Furthermore, the depth of the (central) cutout part 21 is set on the basis of the width of the inlay 10 and the auxiliary antenna 20 (a length of a short direction) and a position of an upper portion of the loop portion 11a so that the antenna conductor is not superimposed on at least the IC chip 11. For example, when the width of the inlay 10 is from about 10 to 15 mm, the depth of the (central) cutout part 21 is a length in a range of about 15 to 20 mm.

Similarly, the width and depth of each of the (left and right) cutout parts 23a, 23b can be set in a predetermined range. Furthermore, the width can be in a range of about 8 to 10 mm (e.g., 6 mm) and the depth can be in a range of about 15 to 20 mm substantially in the same manner as in the (central) cutout part 21.

It is to be noted that also in the present embodiment, the auxiliary antenna 20 can be formed in a mesh state or the like in the same manner as described in the first embodiment, so that a function of the antenna is not impaired by a skin effect. Furthermore, an area of the whole conductor portion of the auxiliary antenna 20 can be reduced.

[Substrate]

The substrate 50 constitutes a substrate layer on which the laminated inlay 10 and auxiliary antenna 20 described above are mounted, and is a member functioning as a dielectric constant regulation layer to the mounted inlay 10. In the present embodiment, the substrate is formed into a band which is one size larger than an outer shape of the laminated inlay 10 and auxiliary antenna 20 so that the inlay 10 and the auxiliary antenna 20 can be mounted and laminated without protruding.

Furthermore, the substrate 50 has a predetermined flexibility and softness, and as shown in FIG. 10, the substrate can be disposed and attached in a surface contact state along a curved surface portion of a metal article 200 having a gently curved shape, e.g., a metal container made of aluminum or a heater including a case made of a metal.

On one surface side (an upper surface side of FIG. 8B) of the substrate 50, the auxiliary antenna 20 and the inlay 10 are laminated and arranged. Furthermore, one surface (an upper surface) of the substrate 50 on which the inlay 10 and the auxiliary antenna 20 are mounted and laminated is covered and coated with the surface layer 40 constituting a cover member. In consequence, the inlay 10 and the auxiliary antenna 20 laminated and sandwiched between the substrate 50 and the surface layer 40 are sealed and protected from the outside.

The surface layer 40 is a sheet-like member to be attached and bonded to the one surface of the substrate 50 on which the inlay 10 and the auxiliary antenna 20 are mounted, and can be formed by using a sheet material or a film material having a flexibility and made of, e.g., paper or synthetic paper, or a resin such as polyethylene, polyethylene terephthalate (PET), polypropylene or polyimide.

On the other hand, the other surface side (a lower surface side of FIG. 8B) of the substrate 50 is provided with an adhesive material constituted of a double-sided tape (an adhesive tape) or the like which is not especially shown in the drawing, and the substrate is attached to the surface of each metal article as an attaching object by an adhesive force of the adhesive material. In consequence, the RF tag 1 is disposed and secured to the surface of the metal article so that the substrate 50 is attached to the surface of the attaching object via the adhesive material and does not easily peel off.

FIG. 10 shows a state where the RF tag 1 according to the present embodiment is disposed and attached in the surface contact state along the curved surface portion of the metal article 200 having the gently curved shape.

The substrate 50 described above is formed so as to have a predetermined specific dielectric constant, thereby regulating the communication characteristics of the inlay 10 laminated together with the auxiliary antenna 20 in the present embodiment, whereby the substrate 50 functions as a dielectric constant regulation layer to the inlay 10 mounted and laminated on the substrate.

For example, when the substrate 50 is formed in a predetermined thickness by using a predetermined member, the substrate can be formed as the dielectric constant regulation layer having a specific dielectric constant suitable for the communication characteristics of the inlay 10.

In consequence, the material and thickness of the substrate 50 are suitably selected and the substrate 50 is only selected and changed, in consideration of various conditions such as the type and communication characteristics of the inlay 10 for use, and each article using the RF tag 1, a use environment and a use frequency zone, so that the RF tag 1 can be used for each of different articles and can cope with each of different communication frequencies.

Here, the substrate 50 has a specific dielectric constant of 1.6 or more and 2.0 or less, or 1.5 or more and 1.9 or less.

Furthermore, the substrate 50 has a thickness of 1.5 mm or more and 2.5 mm or less, or 1.6 mm or more and 2.4 mm or less.

In general, there is a tendency that when the specific dielectric constant of the member constituting the substrate 50 heightens, a hardness of the member also heightens, and the softness and flexibility are deteriorated. Furthermore, even when the thickness of the substrate 50 is large, the softness and flexibility are similarly deteriorated. As a result, when the substrate 50 is attached to the curved surface portion of the metal article 200 having the curved shape, e.g., each metal container made of aluminum or each heater including the case made of the metal, it is difficult to deform and curve the substrate 50 along the curved surface. Furthermore, a substrate edge portion separates, the substrate itself bends, and hence the substrate cannot be brought into surface contact with the curved surface.

On the other hand, when the specific dielectric constant of the substrate 50 is excessively low and the thickness thereof is excessively small, an influence from a metal constituting the attaching object cannot be avoided. Furthermore, the substrate 50 cannot function as the dielectric constant regulation layer to the inlay 10, and it is difficult to improve the communication characteristics of the RF tag 1.

Therefore, in the present embodiment, to obtain an optimum range in which the influence of the metal can be avoided to improve the communication characteristics of the RF tag 1 while acquiring the softness and flexibility of the substrate 50, the substrate 50 is formed so that the specific dielectric constant is 1.5 or more and 2.0 or less, or 1.6 or more and 1.9 or less, and so that the thickness is 1.5 mm or more and 2.5 mm or less, or 1.6 mm or more and 2.4 mm or less.

The substrate 50 is formed to have such ranges of the specific dielectric constant and the thickness, so that the constant softness and flexibility can be imparted to the substrate 50, and the substrate can be attached and bonded to the curved surface portion of the metal article 200, e.g., each metal container made of aluminum or each heater including the case made of the metal, in the surface contact state (see FIG. 10).

Furthermore, the substrate 50 has such ranges of the specific dielectric constant and thickness, so that the influence from the metal constituting the attaching object of the RF tag 1 can be avoided and absorbed by the substrate 50, and such a suitable communication distance as described later can be obtained as the communication characteristics of the RF tag 1 (see FIG. 11).

Here, the attaching object of the RF tag 1 of the present embodiment is the metal article 200, e.g., each metal container or each metal case, and the inside thereof has a hollow state. For such a hollow tubular member, an electric circuit is constituted via the inside of the metal article. Furthermore, when a cross section of the electric circuit enlarges, the impedance decreases. Additionally, the influence of the metal on the RF tag 1 disposed on the surface of the article is lower as compared with a non-hollow (solid) metal.

In the non-hollow (solid) metal, e.g., a rod-like member made of a metal or a metal object having a thickness of several centimeters or more, such decrease of the impedance as in the abovementioned hollow tubular member does not occur. Therefore, to acquire the communication characteristics of the RF tag 1, the specific dielectric constant of the dielectric constant regulation layer needs to be 2 or 3 or more. The member having such a specific dielectric constant usually has a high hardness. Therefore, when the substrate is formed by using such a member, the softness and flexibility cannot be obtained, and it is difficult to form a thin substrate.

Furthermore, each metal container made of aluminum or each case made of the metal for the heater usually has a gently curved surface, and the surface of such a metal article usually includes the curved surface having a curvature of 12.5 or more (r=80 mm or less).

Therefore, the present embodiment specializes in a hollow member made of a hollow metal, e.g., the metal container or the metal case as the attaching object, and hence as the substrate 50 capable of acquiring the communication characteristics of the RF tag 1 in a suitable state, the substrate 50 having the specific dielectric constant and the thickness in the above predetermined ranges has been employed.

Figure 11:
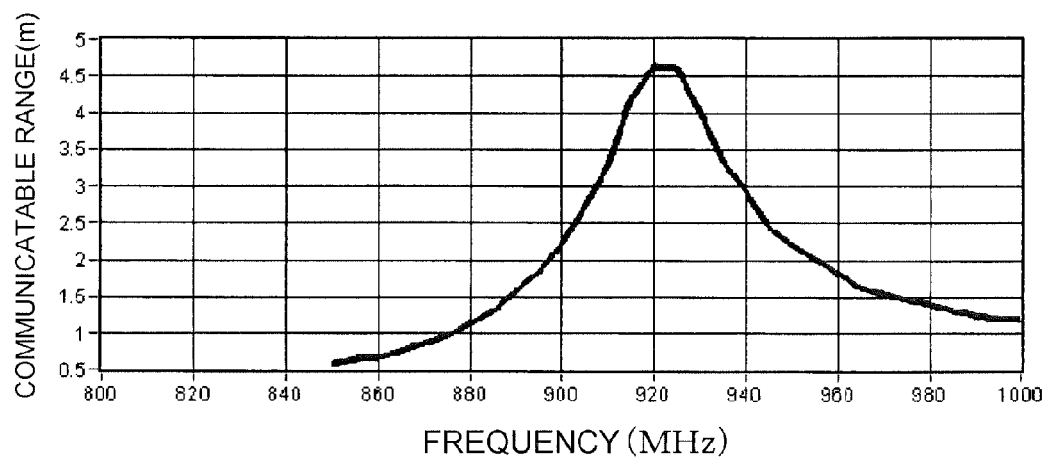
FIG. 11 is a polygonal line graph showing communication characteristics (a relation between a communicatable range and a frequency) of the RF tag according to the second embodiment of the present invention.

When the substrate 50 is employed and the RF tag 1 using a communication frequency of a 920 MHz band is attached to the metal container or the metal case including the curved surface having the curvature of 12.5 or more (r=80 mm or less), the communication can suitably be performed from 4.5 m to 5.0 m (see FIG. 11). Furthermore, the RF tag 1 can be disposed and attached to the surface of the metal article 200 in the surface contact state, because the substrate 50 is curvedly bent (see FIG. 10).

The substrate 50 according to the present embodiment described above can be formed by using a crosslinked polyolefin foaming body such as foamed polyethylene or foamed polypropylene.

Furthermore, the substrate 50 can be constituted of a single band-like member made of the above crosslinked polyolefin foaming body, or a plurality of (e.g., two) band-like members can be superimposed on each other to constitute one substrate 50.

[Communication Characteristics]

The communication characteristics of the RF tag 1 according to the present embodiment having such a constitution as described above will be described with reference to FIG. 11.

FIG. 11 shows the results obtained by conducting a communication distance evaluation of the RF tag 1 according to the present embodiment which is attached to the surface of the curved surface portion (the curvature of 12.5 or more (r=80 mm or less)) of the metal article 200 having the curved shape, e.g., each of metal containers made of aluminum and heaters including the cases made of the metal, along a curved surface direction.

As apparent from the drawing, it is seen that in the RF tag 1 according to the present embodiment, 920 MHz is a peak, and a communication distance of about 4.5 m or more and 5.0 m or less can be obtained.

As described above, according to the RF tag 1 of the second embodiment of the present invention, the auxiliary antenna 20 laminated and disposed on the inlay 10 in the insulating state to the inlay is formed into the rectangular planar shape, and the outer shape or size of the planar auxiliary antenna 20 is set to a predetermined size corresponding to the communication frequency zone of the inlay 10. That is, the length of a pair of facing short sides and one long side adjacent to this pair of short sides of the rectangular surface constituting the auxiliary antenna 20 is set to the length of substantially ½ of the wavelength of the radio wave frequency of the inlay 10. Furthermore, one of the long sides of the rectangular shape is provided with the (central) cutout part 21 of the concave shape opened in the center of the long side and having the predetermined width and depth, and the one or other long side is provided with the pair of (left and right) cutout parts 23a, 23b opened in the edge portion of the long side on both sides sandwiching the (central) cutout part 21.

When the auxiliary antenna 20 is designed as described above, the communication characteristics of the inlay 10 can be regulated in accordance with the communication frequency of the inlay 10 on which the auxiliary antenna 20 is laminated, and the communication characteristics of the inlay 10 can be set and regulated into an optimum state in accordance with the frequency zone.

Furthermore, according to the RF tag 1 of the present embodiment, the substrate 50 constituting the RF tag 1 to be attached to the metal and used is formed to have the predetermined softness and flexibility and the predetermined specific dielectric constant. In consequence, the tag is disposed and attached along the curved surface to the metal article 200 including the curved surface having the predetermined curvature, so that suitable communication characteristics can be obtained.

In consequence, the communication can be performed in a long broad range in a specific communication frequency (the 920 MHz band) while avoiding the influence from the metal article 200 and without requiring, e.g., a large-sized excessive cover, case or holder. Even when the attaching portion is the curved surface, the tag can be attached in the surface contact state without causing peel, drop-out or the like.

Therefore, it is possible to realize the RF tag to be suitably attached especially to the curved portion of the surface of each of metal articles constituting the metal containers made of aluminum and cases made of the metal for the heaters and the like.

Embodiments of the RF tag of the present invention and the metal container have been described above, but the RF tag according to the present invention is not limited only to the abovementioned embodiments, and needless to say, various changes can be made in the gist of the present invention.

For example, as examples of each article using the RF tag according to the present invention, the container for beverage has been described above in the first embodiment, and the metal container made of aluminum or the case made of the metal for the heater or the like has been described in the second embodiment. However, the articles and objects that can use the RF tags of the present invention are not restricted to the bottles for high-class liquors such as whisky, wine or Japanese sake, the containers for beverages, the metal containers made of aluminum, or the cases made of the metal for the heaters and the like.

That is, the RF tag according to one or more embodiments of the present invention is applicable to each of various articles and objects, as long as each of the articles and the objects uses the RF tag and the predetermined information or data of the articles and objects is read and written via the reader/writer. For example, the RF tag according to the second embodiment is applied to each of the articles and objects made of the metal and including the curved surfaces having the predetermined curvatures, and is usable for tableware, cookware, furniture, utensils or a car made of a metal, in addition to, e.g., the metal containers made of aluminum and the cases made of the metal for the heaters and the like.

INDUSTRIAL APPLICABILITY

One or more embodiments of the present invention can suitably be utilized as an RF tag which is attached to and used on each of various articles and objects such as containers for beverages, can containers and metal containers, for example, an RF tag which is laminated, disposed and used on the back surface of a label to be attached to the surface of each of plastic bottles, glass bottles, can containers and pouch containers for beverages and various liquids to be charged thereinto and used.

Furthermore, one or more embodiments of the present invention can suitably be utilized as an RF tag which is attached to and used on each of various articles and objects such as metal containers made of aluminum and cases made of a metal for heaters and the like, especially an RF tag of such a type as to cope with a metal which is attached to each of articles and objects made of the metal and including curved surfaces having predetermined curvatures.

Several embodiments and/or examples of the present invention have been described above in detail, but it is easy for a person skilled in the art to add many changes to these illustrated embodiments and/or examples without substantially departing from inventive teachings and effects of the present invention. Therefore, these many changes are included in the scope of the present invention.

All the contents of Japanese application specification that serves as the basis of the right of priority of the present application provided for the Paris Convention are referred herein.

The invention claimed is:
1. An RF tag comprising:
an inlay entirely sealed with an insulating member and comprising:
an IC chip;
a conductive loop portion surrounding the IC chip; and
an antenna connected to the IC chip via the loop portion;
a planar auxiliary antenna laminated on the inlay in an insulating state to the inlay; and
a substrate on which the inlay and the auxiliary antenna are laminated, wherein
the auxiliary antenna has a rectangular planar shape, wherein long sides of the auxiliary antenna each have a length of substantially ¼ of a wavelength of a radio wave frequency of the inlay,
the auxiliary antenna has a cutout part that divides one of the long sides of the auxiliary antenna into two parts each having a length of substantially ⅛ of the wavelength of the radio wave frequency of the inlay,
the cutout part has a concave shape opened in an edge portion of the one of the long sides of the auxiliary antenna and has a width side and two depth sides, wherein the IC chip of the inlay is disposed in the cutout part,
the width side of the cutout part is entirely overlapped with a width side of the loop portion, and
the auxiliary antenna is directly laminated on a surface of the inlay and electrically connected to the inlay by capacitor coupling.

2. The RF tag according to claim 1, wherein the inlay is entirely sealed with a resin by a sealing film.

3. The RF tag according to claim 1, wherein the auxiliary antenna has a concave outer peripheral edge having the cutout part, and a planar portion on an inner side of a peripheral edge is formed in a mesh state.

4. The RF tag according to claim 1, wherein the substrate is a label sheet to be attached to the surface of a beverage bottle, and the inlay and the auxiliary antenna are laminated on a beverage bottle attaching surface side of the label sheet.

5. An RF tag comprising:
an inlay entirely sealed with an insulating member and comprising:
an IC chip;
a conductive loop portion surrounding the IC chip; and
an antenna connected to the IC chip via the loop portion;
a planar auxiliary antenna laminated on the inlay in an insulating state to the inlay; and
a substrate on which the inlay and auxiliary antenna are mounted,
wherein the auxiliary antenna has a rectangular shape, wherein a pair of facing short sides of the auxiliary antenna and one long side of the auxiliary antenna adjacent to the short sides have a length of substantially ½ of a wavelength of a radio wave frequency of the inlay,
the auxiliary antenna comprises, in a central portion of the one long side of the auxiliary antenna, a central cutout part formed into a concave shape opened in an edge portion of the long side of the auxiliary antenna, wherein the central cutout part has a width side and two depth sides, and the IC chip of the inlay is disposed in the central cutout part,
the auxiliary antenna comprises, in the one or other long side of the auxiliary antenna, a pair of right and left cutout parts opened in the edge portion of the long side on both sides sandwiching the central cutout part,
the width side of the central cutout part is entirely overlapped with a width side of the loop portion, and
the auxiliary antenna is directly laminated on a surface of the inlay and electrically connected to the inlay by capacitor coupling.

6. The RF tag according to claim 5, wherein the central cutout part exposes the IC chip of the inlay and covers a part of a loop circuit formed around the IC chip.

7. The RF tag according to claim 5, wherein the pair of right and left cutout parts expose a part of the antenna of the inlay.

8. The RF tag according to claim 5, wherein the substrate is flexible and attachable to a curved surface having a predetermined curvature in a surface contact state.

9. The RF tag according to claim 8, wherein the curved surface has a curvature radius of 80 mm or less.

10. The RF tag according to claim 5, wherein the substrate functions as a dielectric constant regulation layer to the mounted inlay, and is attachable to a metal surface.

11. The RF tag according to claim 2, wherein the auxiliary antenna has a concave outer peripheral edge having the cutout part, and a planar portion on an inner side of a peripheral edge is formed in a mesh state.

12. The RF tag according to claim 2, wherein the substrate is a label sheet to be attached to the surface of a beverage bottle, and the inlay and the auxiliary antenna are laminated on a beverage bottle attaching surface side of the label sheet.

13. The RF tag according to claim 6, wherein the pair of right and left cutout parts expose a part of the antenna of the inlay.

14. The RF tag according to claim 6, wherein the substrate is flexible and attachable to a curved surface having a predetermined curvature in a surface contact state.

15. The RF tag according to claim 14, wherein the curved surface has a curvature radius of 80 mm or less.

16. The RF tag according to claim 6, wherein the substrate functions as a dielectric constant regulation layer to the mounted inlay, and is attachable to a metal surface.

17. The RF tag according to claim 1, wherein a length of the width side of the cutout part is approximately the same as a length of the width side of the loop portion.

18. The RF tag according to claim 5, wherein a length of the width side of the cutout part is approximately the same as a length of the width side of the loop portion.

19. The RF tag according to claim 1, wherein each depth side of the loop portion is overlapped with each of the two depth sides of the cutout part.

20. The RF tag according to claim 5, wherein each depth side of the loop portion is overlapped with each of the two depth sides of the central cutout part.

* * * * *